(12) United States Patent
Shimomura et al.

(10) Patent No.: US 12,496,826 B2
(45) Date of Patent: Dec. 16, 2025

(54) INKJET HEAD NOZZLE PLATE, MANUFACTURING METHOD THEREFOR, INKJET HEAD, AND INKJET RECORDING DEVICE

(71) Applicant: Konica Minolta, Inc., Tokyo (JP)

(72) Inventors: Akihisa Shimomura, Atsugi (JP); Atsushi Imura, Kokubunji (JP); Tetsuji Machida, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 195 days.

(21) Appl. No.: 18/269,872

(22) PCT Filed: Jan. 5, 2021

(86) PCT No.: PCT/JP2021/000066
§ 371 (c)(1),
(2) Date: Jun. 27, 2023

(87) PCT Pub. No.: WO2022/149181
PCT Pub. Date: Jul. 14, 2022

(65) Prior Publication Data
US 2024/0059063 A1    Feb. 22, 2024

(51) Int. Cl.
*B41J 2/14*    (2006.01)
*B41J 2/16*    (2006.01)

(52) U.S. Cl.
CPC .............. *B41J 2/1433* (2013.01); *B41J 2/162* (2013.01); *B41J 2/1634* (2013.01)

(58) Field of Classification Search
CPC .......... B41J 2/1433; B41J 2/162; B41J 2/1634
See application file for complete search history.

(56) References Cited

U.S. PATENT DOCUMENTS

| 4,501,626 | A | * | 2/1985 | Sudo | .................. | B01D 39/2086 |
| | | | | | | 148/320 |
| 6,507,002 | B1 | * | 1/2003 | Koide | .................. | B23K 26/066 |
| | | | | | | 219/121.71 |
| 2019/0143686 | A1 | * | 5/2019 | Hirata | ...................... | B41J 2/162 |
| | | | | | | 347/47 |

FOREIGN PATENT DOCUMENTS

JP    3755332 B2    1/2006

OTHER PUBLICATIONS

PCT International Preliminary Report on Patentability with Written Opinion for International Searching Authority for International Application No. PCT/JP2021/000066; Issue Date, Jul. 4, 2023.
(Continued)

*Primary Examiner* — Jason S Uhlenhake
(74) *Attorney, Agent, or Firm* — CANTOR COLBURN LLP (57) ABSTRACT

An inkjet head nozzle plate formed from stainless steel in which a deformation in a nozzle inner wall or a nozzle tip is less, a method of manufacturing the inkjet head nozzle plate, and an inkjet head and an inkjet recording device which use the inkjet head nozzle plate. The inkjet head nozzle plate may be an inkjet head nozzle plate formed from at least stainless steel. The stainless steel is austenitic stainless steel in which a content ratio of a martensite phase is 5.4% or less.

17 Claims, 5 Drawing Sheets

(56) References Cited

OTHER PUBLICATIONS

International Search Report for International Application No. PCT/JP2021/000066; Mail Date, Mar. 23, 2021.
Liu, Xinbing "Industrial applications of ultrahigh precision short-pulse laser processing", (Invited Paper) Proc. SPIE 5713, Photon Processing in Microelectronics and Photonics IV, (Apr. 12, 2005); doi: 10.1117/12.699113; 16 pages.

* cited by examiner

| | | |
|---|---|---|
| ▓ | Iron bcc(old) | 5.3% |
| ☐ | Iron fcc | 88.6% |

| | | |
|---|---|---|
| ▓ | Iron bcc(old) | 5.4% |
| ☐ | Iron fcc | 94% |

| | | |
|---|---|---|
| ▓ | Iron bcc(old) | 1.4% |
| ☐ | Iron fcc | 92.3% |

INKJET HEAD NOZZLE PLATE, MANUFACTURING METHOD THEREFOR, INKJET HEAD, AND INKJET RECORDING DEVICE

CROSS REFERENCE TO RELATED APPLICATIONS

This is the U.S. national stage of application No. PCT/JP2021/000066, filed on Jan. 5, 2021, the contents of which are incorporated herein by reference.

TECHNICAL FIELD

The present invention relates to an inkjet head nozzle plate, a method of manufacturing an inkjet head nozzle plate, an inkjet head, and an inkjet recording device.

More specifically, the invention relates to an inkjet head nozzle plate formed from stainless steel in which deformation in a nozzle inner wall or a nozzle tip is less, and the like.

BACKGROUND ART

In an inkjet head, an actuator is arranged in each ink channel, and an ink is ejected from an ink ejection port communicating with each ink channel, that is, a nozzle plate in which a nozzle is formed.

In the related art, as a base material of the inkjet head nozzle plate (hereinafter, also referred to simply as "nozzle plate"), stainless steel that is excellent in chemical stability against ink and durability against mechanical friction has been used. Particularly, steel types such as SUS 304 and SUS 316 which are austenite stainless steel have been frequently used. These steel types are produced for general purposes and are excellent in cost in comparison to other steel types. In addition, since the Cr content is relatively high, and corrosion resistance is excellent, and thus chemical stability is excellent as a base material of a nozzle plate that is in contact with ink.

As a method of forming a nozzle in an austenitic stainless steel base material as described above, there is known a method using laser processing (Non-Patent Document 1) or a method in which a concave portion is formed through punching and a convex portion on a rear surface is polished and removed (Patent Document 1).

However, in a nozzle plate in which austenitic stainless steel in the related art is used as a base material and a nozzle is formed by laser processing, there is a problem in which a minute concave portion (needle hole) is likely to occur in a nozzle inner wall.

In addition, even in the method in which a concave portion is formed by punching, and a convex portion on a rear surface is polished and removed, in a case where an austenitic stainless steel in the related art is used as a base material, when forming the concave portion, a stripe-shaped concavo-convex portion occurs in a nozzle inner wall from a flow passage side toward a nozzle tip (tip in an ejection direction) due to plastic deformation, and there is a problem that the stripe-shaped concavo-convex portion remains at the nozzle tip as a burr (protrusion) when polishing and removing the convex portion on a rear surface.

When a deformation such as the minute concave portion and the stripe-shaped concavo-convex portion exists in the nozzle inner wall, air bubbles occurred in an ink are trapped and a failing nozzle is likely to occur, and thus the frequency of maintenance increases and an operation rate of an inkjet recording device decreases. In addition, the deformation such as the minute concave portion, the stripe-shaped concavo-convex portion, and the burr as described above exists in the vicinity of the nozzle tip, an ink ejection angle ejecting from the nozzle is inclined, and thus a variation in a landing position, drawing unevenness, stripe feeling, pattern fragment, and the like are likely to occur, and a drawing quality decreases.

There is a demand for an inkjet head nozzle plate formed from stainless steel in which a deformation such as a minute concave portion, a stripe-shaped concavo-convex portion, and a burr in a nozzle inner wall or a nozzle tip is less.

CITATION LIST

Patent Literature

Patent Document 1: Japanese Patent No. 3755332
Non-Patent Document 1: Xinbing Liu "Industrial applications of ultrahigh precision short-pulse laser processing (Invited Paper)", Proc. SPIE 5713, Photon Processing in Microelectronics and Photonics IV, (12 Apr. 2005)

SUMMARY OF THE INVENTION

Technical Problem

The invention has been made in consideration of the above-described problems and situations, and an object thereof is to provide an inkjet head nozzle plate formed from stainless steel in which a deformation in a nozzle inner wall or a nozzle tip is less, a method of manufacturing the inkjet head nozzle plate, and an inkjet head and an inkjet recording device which use the inkjet head nozzle plate.

Solution to Problem

In order to solve the above-described problems, the present inventors investigated the cause of the problem and found that it is possible to provide an inkjet head nozzle plate formed from stainless steel in which deformation in a nozzle inner wall or a nozzle tip is less, and the like when using stainless steel having a specific crystal structure ratio, and as a result, they have accomplished the invention.

That is, the object according to the invention is accomplished by the following aspects.

Aspect 1. According to Aspect 1 of the invention, there is provided an inkjet head nozzle plate that is formed from at least stainless steel. The stainless steel is austenitic stainless steel in which a content ratio of a martensite phase is 5.4% or less.

Aspect 2. According to Aspect 2 of the invention, there is provided an inkjet head nozzle plate that is formed from at least stainless steel. The stainless steel is stainless steel in which an area ratio of a face centered cubic lattice which is measured by electron backscatter diffraction is 92.0% or more, and an area ratio of a body centered cubic lattice which is measured by electron backscatter diffraction is 5.4% or less.

Aspect 3. In the inkjet head nozzle plate according to Aspect 1 or Aspect 2, the stainless steel is stainless steel in which a frequency average crystal grain size that is measured by electron backscatter diffraction is 0.9 μm or less.

Aspect 4. In the inkjet head nozzle plate according to any one of Aspect 1 to Aspect 3, the stainless steel is stainless steel in which an area-ratio weighted average crystal grain size that is measured by electron backscatter diffraction is 2.3 μm or less.

Aspect 5. In the inkjet head nozzle plate according to any one of Aspect 1 to Aspect 4, the stainless steel is stainless steel in which a ratio of a frequency average crystal grain size that is measured by electron backscatter diffraction to an opening diameter of a nozzle tip is 4.7% or less.

Aspect 6. In the inkjet head nozzle plate according to any one of Aspect 1 to Aspect 5, the stainless steel is stainless steel in which a ratio of an area-ratio weighted average crystal grain size that is measured by electron backscatter diffraction to an opening diameter of a nozzle tip is 12.0% or less.

Aspect 7. According to Aspect 7 of the invention, there is provided a method of manufacturing the inkjet head nozzle plate according to any one of Aspect 1 to Aspect 6, the method including: a process of forming a nozzle by laser processing.

Aspect 8. According to Aspect 8 of the invention, there is provided a method of manufacturing the inkjet head nozzle plate according to any one of Aspect 1 to Aspect 6, the method including: a process of forming a nozzle by forming a concave portion by punching, and of subsequently polishing and removing a convex portion on a rear surface.

Aspect 9. According to Aspect 9 of the invention, there is provided an inkjet head that uses the inkjet head nozzle plate according to any one of Aspect 1 to Aspect 6.

Aspect 10. According to Aspect 10 of the invention, there is provided an inkjet recording device including the inkjet head according to Aspect 9.

Advantageous Effects of Invention

According to the aspects of the invention, it is possible to provide an inkjet head nozzle plate formed from stainless steel in which a deformation in a nozzle inner wall or a nozzle tip is less, a method of manufacturing the inkjet head nozzle plate, and an inkjet head and an inkjet recording device which use the inkjet head nozzle plate.

Although an exhibition mechanism or an operation mechanism of the effect of the invention are not clear but are assumed as follows.

The present inventors have found that a martensite phase, which is minutely contained, is the cause for occurrence of deformations such as a minute concave portion, a stripe-shaped concavo-convex portion, and a burr when forming a nozzle in austenite stainless steel that has been used in the related art. Specifically, the present inventors have found that in a case of using stainless steel that is austenitic stainless steel in which a content ratio of a martensite phase is more than 5.4%, an area ratio of a face centered cubic lattice is less than 92.0%, and an area ratio of a body centered cubic lattice is more than 5.4%, the deformation may significantly occur when forming the nozzle.

An austenite phase and the martensite phase are different in a crystal structure, the austenite phase has a face centered cubic structure, and the martensite phase has a body centered cubic structure. Since the body centered cubic structure and the face centered cubic structure are different in a space filling rate of a unit lattice, material physical properties are different from each other, and thus this difference may have an influence on occurrence of a deformation in a nozzle inner wall or a nozzle tip.

As an example, it is known that a typical martensitic stainless steel has a lower melting point and higher thermal conductivity in comparison to the austenitic stainless steel. From this point, it is considered that the martensite phase has higher thermal conductivity and a higher laser ablation rate in laser processing in comparison to the austenite phase.

Accordingly, in the laser processing, if the martensite phase is included in the austenitic stainless steel as a heterogeneous phase, it is considered that the minutely included martensite phase is preferentially laser-ablated, and as a result, a minute concave portion (needle hole) occurs in the nozzle inner wall.

In addition, as another example, since typical martensite stainless steel tends to have a lower density and a lower elongation rate in comparison to the austenitic stainless steel, the typical martensitic stainless steel is less likely to be plastically deformed under a tensile load. From this point, it is considered that the martensite phase is less likely to be plastically deformed in comparison to the austenite phase.

Therefore, if the martensite phase is included in the austenitic stainless steel as a heterogeneous phase, when a stainless steel base material is plastically deformed due to punching by a punching tool, a deviation occurs in a plastic deformation response between the austenite phase and the martensite phase. According to this, it is considered that the stripe-shaped concavo-convex portion occurs in the nozzle inner wall from a flow passage side toward a nozzle tip side as a result.

Further, in a case where the stripe-shaped concavo-convex portion is formed in the nozzle inner wall in this manner, when subsequently polishing and removing a convex portion on a rear surface, the stripe-shaped concavo-convex portion may be the cause for formation of a burr in an edge of the nozzle tip.

Accordingly, as in the invention, when using austenite stainless steel in which a content ratio of the martensite phase is 5.4% or less, or when using stainless steel in which an area ratio of the face centered cubic lattice which is measured by electron backscatter diffraction is 92.0% or more and an area ratio of the body centered cubic lattice which is measured by the electron backscatter diffraction is 5.4% or less, occurrence of a deformation can be suppressed when forming a nozzle.

Due to the exhibition mechanism or the operation mechanism, it is considered that an inkjet head nozzle plate formed from stainless steel in which a deformation is less in the nozzle inner wall or the nozzle tip can be provided.

DETAILED DESCRIPTION

As an embodiment, an inkjet head nozzle plate of the invention is an inkjet head nozzle plate that is formed from at least stainless steel. The stainless steel is austenitic stainless steel in which a content ratio of a martensite phase is 5.4% or less.

In addition, as an embodiment, the inkjet head nozzle plate of the invention is an inkjet head nozzle plate that is formed from at least stainless steel. The stainless steel is stainless steel in which an area ratio of a face centered cubic lattice which is measured by electron backscatter diffraction is 92.0% or more, and an area ratio of a body centered cubic lattice which is measured by electron backscatter diffraction is 5.4% or less.

In the inkjet head nozzle plate of the invention, it is preferable that the stainless steel is stainless steel in which a frequency average crystal grain size that is measured by electron backscatter diffraction is 0.9 μm or less from the viewpoint of capable of suppressing occurrence of a deformation.

In the inkjet head nozzle plate of the invention, it is preferable that the stainless steel is stainless steel in which an area-ratio weighted average crystal grain size that is measured by electron backscatter diffraction is 2.3 μm or less from the viewpoint of capable of suppressing occurrence of a deformation.

In the inkjet head nozzle plate of the invention, it is preferable that the stainless steel is stainless steel in which a ratio of a frequency average crystal grain size that is measured by electron backscatter diffraction to an opening diameter of a nozzle tip is 4.7% or less from the viewpoint of capable of suppressing occurrence of a deformation.

In the inkjet head nozzle plate of the invention, it is preferable that the stainless steel is stainless steel in which a ratio of an area-ratio weighted average crystal grain size that is measured by electron backscatter diffraction to an opening diameter of a nozzle tip is 12.0% or less from the viewpoint of capable of suppressing occurrence of a deformation.

As an embodiment, a method of manufacturing an inkjet head nozzle plate of the invention is a method of manufacturing the inkjet head nozzle plate of the invention. The method includes a process of forming a nozzle by laser processing.

In addition, as an embodiment, the method of manufacturing an inkjet head nozzle plate of the invention is a method of manufacturing the inkjet head nozzle plate of the invention. The method includes a process of forming a nozzle by forming a concave portion by punching, and of subsequently polishing and removing a convex portion on a rear surface.

The inkjet head nozzle plate of the invention or an inkjet head using the inkjet head nozzle plate can be preferably used in an inkjet recording device.

Hereinafter, the invention, constituent elements thereof, and embodiments and aspects for carrying out the invention will be described in detail. In the present application, "to" is used to mean that numerical values before and after "to" are included as a lower limit value and an upper limit value.

(1) Overview of Inkjet Head Nozzle Plate of Invention

As an embodiment, the inkjet head nozzle plate of the invention is an inkjet head nozzle plate that is formed from at least stainless steel. The stainless steel is austenitic stainless steel in which a content ratio of a martensite phase is 5.4% or less.

In addition, as an embodiment, the inkjet head nozzle plate of the invention is an inkjet head nozzle plate that is formed from at least stainless steel. The stainless steel is stainless steel in which an area ratio of a face centered cubic lattice which is measured by electron backscatter diffraction is 92.0% or more, and an area ratio of a body centered cubic lattice which is measured by electron backscatter diffraction is 5.4% or less.

In the present application, a term "ink" is not limited to liquids which contain a dye or a pigment, and represents, for example, liquids which include a polymer material such as varnish, a liquid that contains metal fine particles, or the like, and are used for printing, recording, dyeing, or the like. Accordingly, an ink that is ejected from the inkjet head nozzle plate of the invention is not limited to liquids which contain a dye or a pigment.

(2) Crystal Structure of Stainless Steel

In the present application, the term "austenite stainless steel" represents stainless steel in which austenite is a main structure at an ordinary temperature. Examples thereof include austenite steel such as SUS 301, SUS 304, and SUS 316 which are defined in JIS G 4304. In the invention, SUS 304 is preferable from the viewpoint of chemical stability against the ink.

The term "austenite phase" represents a phase in which a crystal structure is a face centered cubic lattice (FCC) in the stainless steel. In addition, the term "martensite phase" represents a phase in which a crystal structure is a body centered cubic lattice (BCC).

A composition ratio of stainless steel is not completely uniform microscopically, and even in the austenite stainless steel, a region in a thermochemically metastable state is included microscopically. In the region, free energy of the martensite phase is smaller than free energy of the austenite phase at an ordinary temperature, and when being subjected to plastic deformation such as cold rolling, strain-induced martensitic transformation occurs, and a little amount of martensite phase is included in the austenite phase.

Whether the crystal structure of the stainless steel is either the face centered cubic lattice or the body centered cubic lattice can be measured by electron backscatter diffraction (EBSD).

The term "electron backscatter diffraction" is a method of obtaining crystal information by analyzing an electron beam scattering pattern (Kikuchi line) corresponding to a crystal orientation which is obtained by irradiating a sample inclined in a scanning electron microscope (SEM) with electron beams. A crystal grain map can be prepared by identifying a site having a certain orientation difference or more between adjacent measurement points as a boundary of respective crystal grains. In addition, crystal structures and crystal grain sizes of the respective crystal grains can be measured.

In the measurement by the electron backscatter diffraction (hereinafter, also referred to as "EBSD measurement"), although crystal grains of which a crystal structure cannot be determined also exist, the area ratio [%] of the face centered cubic lattice and the area ratio [%] of the body centered cubic lattice in the invention are ratios to an area excluding the crystal grains of which a crystal structure cannot be determined.

In the stainless steel according to an embodiment of the invention, the area ratio of the face centered cubic lattice which is measured by the above-described method is 92.0% or more, and the area ratio of the body centered cubic lattice which is measured by the above-described method is 5.4% or less. According to this, occurrence of a deformation can be suppressed when forming a nozzle.

The area ratio [%] of the face centered cubic lattice and the area ratio [%] of the body centered cubic lattice in the invention are values rounded to the first decimal place.

In addition, the area ratio [%] of the face centered cubic lattice which is measured by the electron backscatter diffraction and the area ratio [%] of the body centered cubic lattice which is measured by electron backscatter diffraction can be regarded as a content ratio [%] of the austenite phase and a content ratio [%] of the martensite phase, respectively.

The content ratio [%] of the austenite phase and the content ratio [%] of the martensite phase in the invention are values rounded to the first decimal place.

That is, the stainless steel according to an embodiment of the invention is austenitic stainless steel in which the content ratio of the martensite phase of which a crystal structure is a body centered cubic lattice is 5.4% or less. According to this, occurrence of a deformation can be suppressed when forming a nozzle.

In addition, stainless steel in which a concentration of carbon is low can also be used in the stainless steel according to the invention. In punching, a strain-induced martensitic transformation occurs, crystal grains become fine, and the stainless steel is hardened, and a deformation is likely to occur. In the stainless steel in which the concentration of carbon is low, the strain-induced martensitic transformation is less likely to occur, and thus occurrence of the deformation can be suppressed. Examples of the stainless steel in which the concentration of carbon is low include SUS 304L, SUS 316L, and the like.

(3) Crystal Grain Size of Stainless Steel

In the stainless steel according to the invention, it is preferable that the average crystal grain size measured by the electron backscatter diffraction is low from the viewpoint of capable of suppressing occurrence of a deformation. Specifically, a frequency average crystal grain size is preferably 0.9 μm or less, or an area-ratio weighted average crystal grain size is preferably 2.3 lam or less.

The frequency average crystal grain size [μm] and the area-ratio weighted average crystal grain size [μm] in the invention are values rounded to the first decimal place.

In addition, in the stainless steel according to the invention, a ratio of the frequency average crystal grain size that is measured by the electron backscatter diffraction to an opening diameter of a nozzle tip (tip in an ejection direction) is preferably 4.7% or less, or a ratio of the area-ratio weighted average crystal grain size that is measured by the electron backscatter diffraction to the opening diameter of the nozzle tip (tip in the ejection direction) is preferably 12.0% or less. According to this, occurrence of a deformation can be suppressed when forming a nozzle.

The ratio [%] of the frequency average crystal grain size to the opening diameter of the nozzle tip and the ratio [%] of the area-ratio weighted average crystal grain size to the opening diameter of the nozzle tip are values rounded to the first decimal place.

The term "frequency average crystal grain size" is a value obtained by dividing a total value of crystal grain sizes in a measurement region by the frequency (the number of particles).

The term "area-ratio weighted average crystal grain size" is calculated by weighting data according to a ratio of an occupying area in a measurement region, and is a value obtained by dividing a total value, which is obtained by multiplying a crystal grain size by a crystal grain area, by a total value of crystal grain areas.

In a case where an opening shape of the nozzle tip is a circular shape, the term "an opening diameter of a nozzle tip" represents a diameter thereof, and in a case where the opening shape is not a circular shape, the term represents a diameter of a circle when being replaced with the circle having the same area as an opening area.

(4) Formation of Nozzle

As an embodiment, a method of manufacturing an inkjet head nozzle plate according to the invention is a method of manufacturing the inkjet head nozzle plate of the invention. The method includes a process of forming a nozzle by laser processing.

In addition, as an embodiment, a method of manufacturing an inkjet head nozzle plate according to the invention is a method of manufacturing the inkjet head nozzle plate of the invention. The method includes a process of forming a nozzle by forming a concave portion by punching, and of subsequently polishing and removing a convex portion on a rear surface.

A shape of the nozzle that is formed is preferably a funnel shape from the viewpoint of ink ejection stability. For example, the shape may be set to a shape described in Paragraph [0037] of JP 2017-19174A. When the nozzle shape is set to the funnel shape, trapping of air bubbles into the nozzle can be suppressed when a meniscus surface is pulled in accordance with ink ejection.

<Formation of Nozzle by Laser Processing>

As a method of forming a nozzle by laser processing, for example, a method described in Paragraphs [0014] to [0035] in Japanese Patent No. 4455884, Paragraphs [0016] to [0036] in JP 2017-19174A, or the like can be used.

Specifically, a laser light source that emits laser light having a pulse width of 30 picoseconds or less, a piezo control mirror for scanning laser light, and a condensing lens for condensing laser beams are used, and a nozzle is formed by performing laser ablation processing while performing condensing of laser light to a stainless steel base material and scanning. A three-dimensional shape of the nozzle can be controlled by scanning pattern with laser beams.

The shorter the pulse width of the laser light, the less a thermal effect on the stainless steel. Femtosecond pulse is preferably used rather than a picosecond pulse. In addition, since dust of the stainless steel is generated in accordance with the laser ablation processing, it is preferable to perform laser processing while blowing out a gas such as the air so as to remove the dust from a nozzle processing position. In addition, since a plurality of nozzles can be simultaneously processed by dividing laser beams by using a diffractive optical element (DOE) or the like, productivity of a nozzle processing process can be improved.

In accordance with the progress of the ablation processing on the stainless steel base material, it is preferable to change a height of the stainless steel base material or a height of a lens in order for a lens focal position to match with a base material surface. When a nozzle processing height and a lens focal height have matched each other in synchronization, processing in a defocused state is prevented, and an influence of lens aberration is reduced. Accordingly, abnormality in a nozzle processing shape can be reduced.

<Formation of Nozzle by Punching+Polishing and Removal>

Formation of a nozzle by punching+polishing and removal can be performed, for example, by a method described in Paragraphs [0008] to [0014] in Japanese Patent No. 3755332.

A punching tool is used in formation of a concave portion by punching. The punching tool has a shape conforming to a nozzle shape. The punching tool is pressed into a surface of the stainless steel base material on a flow passage side to plastically deform the stainless steel base material, and a concave shape to which the nozzle shape is transferred can be formed. In addition, when the punching tool is pressed, a die provided with a punching die is used to receive and grip the deformed and protruding stainless steel base material.

Next, the nozzle is formed by scrapping off a convex portion formed on an ejection surface side through polishing. Specifically, the convex portion can be polished and removed by two stages of polishing including rough polishing and finish polishing.

As the rough polishing, tape polishing is preferably used. The tape polishing is a polishing method by pressing a film to which fine abrasive grains are fixed, and the film is transmitted before abrasion or clogging of the abrasive grains progresses, and thus finish is stable and can be automated.

As the finish polishing, chemical mechanical polishing (CMP) is preferably used. When performing supply of a polishing solution containing a polishing agent, pressing of a polishing pad, and relative movement of a workpiece in parallel, due to a combined effect of a chemical effect and mechanical polishing, an unevenness that is left in the rough polishing is scraped to obtain a very flat surface.

(5) Use of Inkjet Head Nozzle Plate

The inkjet head nozzle plate of the invention can be used in an inkjet head, an inkjet recording device, an inkjet recording method, and the like.

In the inkjet head nozzle plate of the invention, since a deformation in the nozzle inner wall or the nozzle tip is less, in the inkjet head using the nozzle plate, a failing nozzle is less likely to occur, and the frequency of maintenance of an inkjet recording device using the inkjet head can be reduced. In addition, since a variation in a landing position, drawing unevenness, stripe feeling, pattern fragment, and the like are less likely to occur, a drawing quality becomes satisfactory.

In the inkjet head of the invention, a configuration other than the configuration using the inkjet head nozzle plate of the invention is not particularly limited, and as in a typical inkjet head, the inkjet head may be provided with a pressure chamber, a piezoelectric actuator, a vibration plate, a wiring substrate, a common ink chamber, a driver, and the like.

In addition, in the inkjet recording device of the invention, a configuration other than the configuration provided with the inkjet head of the invention is not particularly limited, and as in a typical inkjet recording device, the inkjet recording device may be provided with a conveyer belt, a conveyor roller, and the like in addition to the head unit constituted by the inkjet head.

In a case of using the inkjet head nozzle plate of the invention in an inkjet recording method, it is preferable to use an ink of which a surface tension is within a range of 20 to 40 mN/m in combination with the nozzle plate. In addition, it is preferable to reduce dissolved oxygen in the ink to 20% or less under the atmospheric pressure before use by providing an ink degassing mechanism or by using degassed ink in the recording device. In addition, more preferably, the dissolved oxygen is set to 3.0 g/mL or less.

According to this, since air bubbles as the cause for the failing nozzle are less likely to occur in the ink, occurrence of the failing nozzle can be further reduced.

EXAMPLES

Hereinafter, the invention will be described in detail with reference to examples, but the invention is not limited thereto.

(1) Example 1: Nozzle Plate in which Nozzle was Formed by Laser Processing (1.1) Stainless Steel As the stainless steel, the following austenitic stainless steel A to austenitic stainless steel C (manufactured by NIPPON STEEL Chemical & Material Co., Ltd., thickness: 50 μm) were used.

Stainless steel A: Formed from SUS 304-CSP-H-TA
Stainless steel B: Lot 1 formed from SUS 304-CSP-H
Stainless steel C: Lot 2 formed from SUS 304-CSP-H "H" in the stainless steel represents a hard material. In addition, "TA" represents a material that has been subjected to a tension annealing treatment for removing a stress or warping of the stainless steel by rolling. That is, the stainless steel A is a hard material that has been subjected to the tension annealing treatment, and stainless steel B and the stainless steel C are hard materials which have not been subjected to the tension annealing treatment. "CSP" represents cold-rolled steel strip for springs.

Figure 1A:
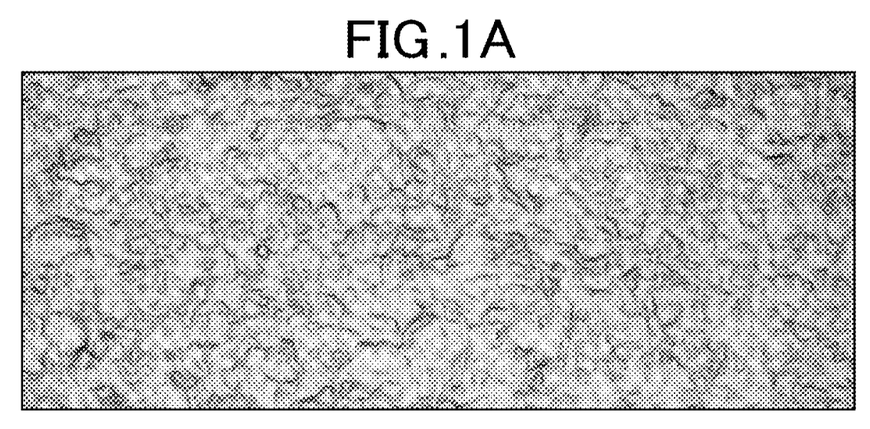
FIG. 1A is an optical microscope image of stainless steel A.
Figure 1B:
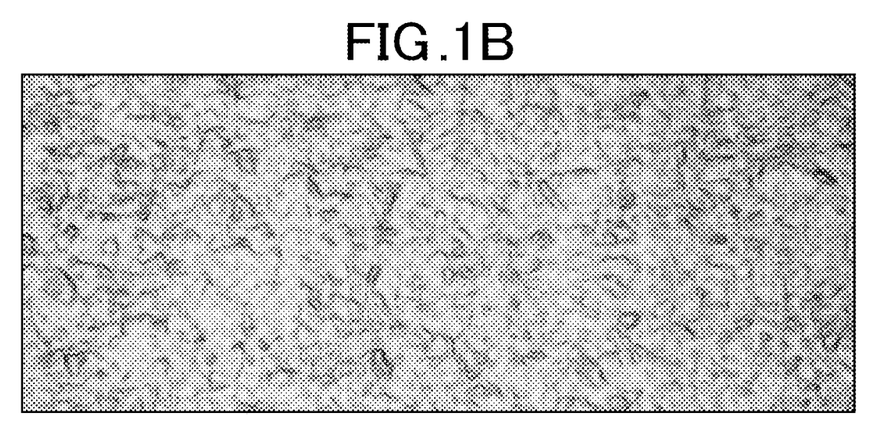
FIG. 1B is an optical microscope image of stainless steel B.
Figure 1C:
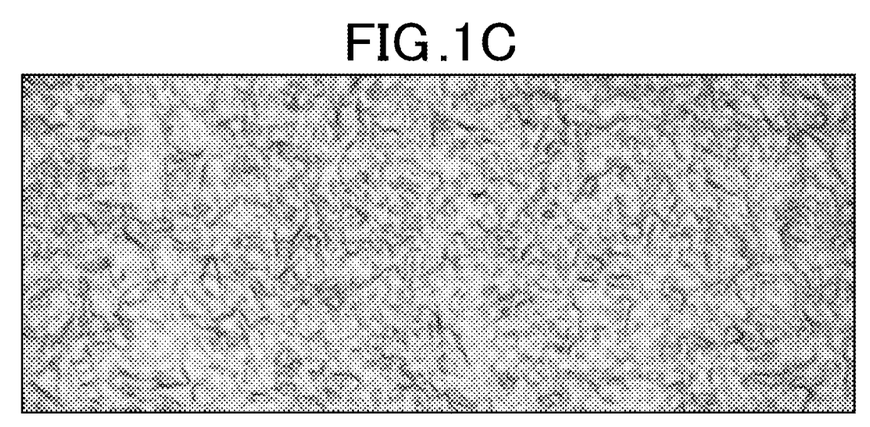
FIG. 1C is an optical microscope image of stainless steel C.

FIGS. 1A to 1C are optical microscope images of the stainless steel A to stainless steel C which have been captured at a magnification of 100 times. With regard to surface morphology, no difference was observed between the stainless steel A to stainless steel C.

Next, EBSD measurement results will be described. EBSD measurement was performed by using SEM JSM-7001F manufactured by JEOL Ltd. and OIM software Ver. 7.3 manufactured by TSL Solutions LTD., and in the EBSD measurement, an SEM acceleration voltage was set to 15 kV, a sample inclination angle was set to 70°, a measurement region was set to 100 μm×40 μm, a measurement step (measurement point interval) was set to 0.2 μm, and a threshold value of an orientation difference of crystal grain boundary was set to 5°.

Figure 2A:
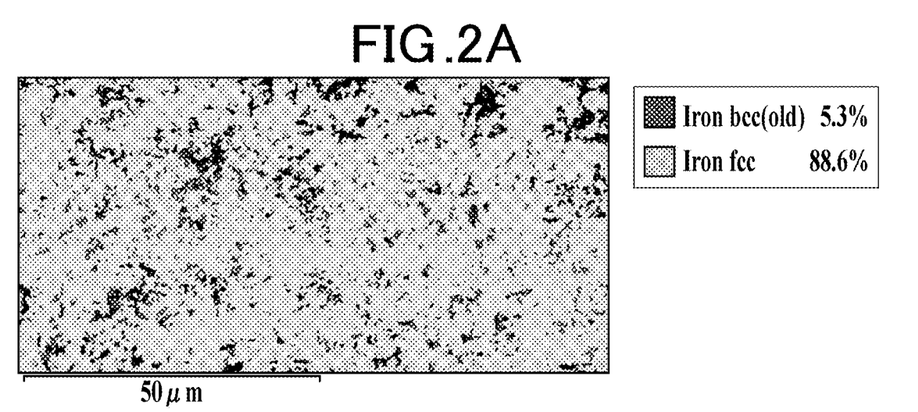
FIG. 2A is a crystal grain map of the stainless steel A which is obtained through EBSD measurement.
Figure 2B:
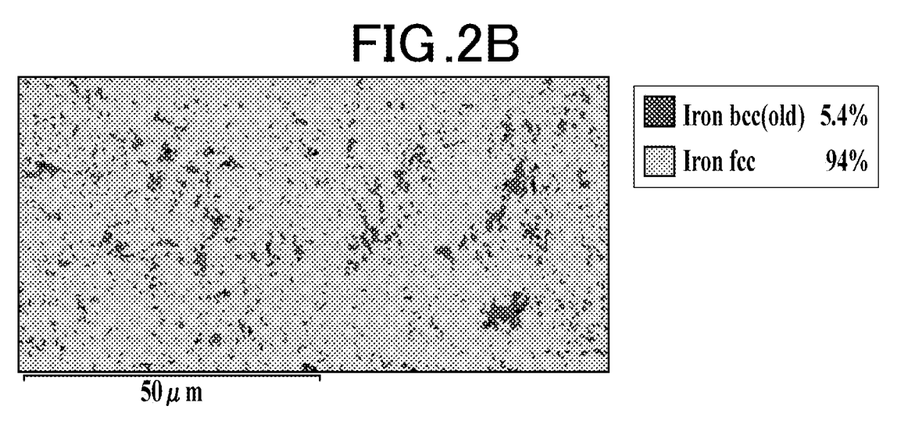
FIG. 2B is a crystal grain map of the stainless steel B which is obtained through EBSD measurement.
Figure 2C:
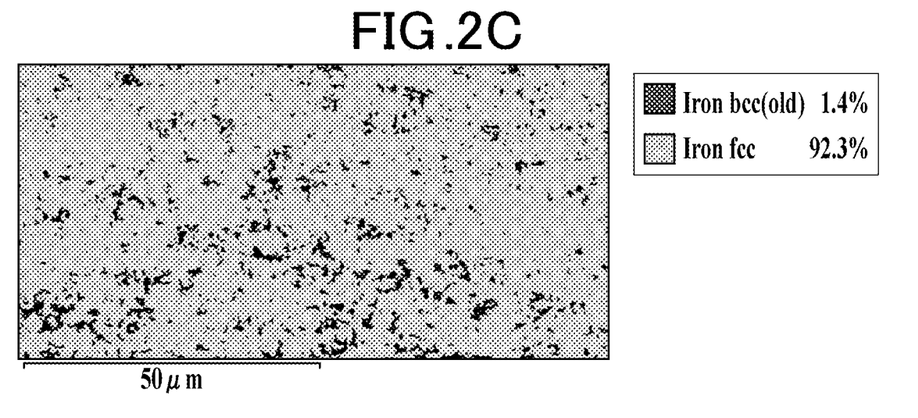
FIG. 2C is a crystal grain map of the stainless steel C which is obtained through EBSD measurement.

FIGS. 2A to 2C are crystal grain maps of the stainless steel A to stainless steel C which were obtained by the EBSD measurement. In the drawings of FIGS. 2A to 2C, mapping was made by dividing a difference in crystal structure into a face centered cubic lattice region, a body centered cubic lattice region, and a region in which the crystal structure cannot be determined.

Since the area ratio [%] of the face centered cubic lattice and the area ratio [%] of the body centered cubic lattice in the invention are ratios to an area excluding crystal grains of which a crystal structure cannot be determined, it is necessary to obtain the area ratios by the following calculation formula by using ratios (values of Iron bcc and Iron fcc shown in the drawings) to the entirety including the region in which a crystal structure cannot be determined instead of these ratios to the entirety.

Area ratio [%] of face centered cubic lattice=Iron fcc/(Iron bcc+Iron fcc)×100

Area ratio [%] of body centered cubic lattice=Iron bcc/(Iron bcc+Iron fcc)×100

The area ratio [%] of the face centered cubic lattice and the area ratio [%] of the body centered cubic lattice which were obtained by the above-described calculation are as shown in the following Table I.

The area ratio [%] of the face centered cubic lattice and the area ratio [%] of the body centered cubic lattice in the stainless steel can be regarded as a content ratio [%] of the austenite phase and content ratio [%] of the martensite phase in the stainless steel.

It can be understood that in any of the stainless steel A to stainless steel C, the area ratio of the face centered cubic lattice exceeds 90%, and the austenite phase is a main phase. In addition, in any of the stainless steel A to stainless steel C, the area ratio of the body centered cubic lattice is significantly smaller than the area ratio of the face centered cubic lattice, and thus the martensite phase can be referred to as a heterogeneous phase.

The frequency average crystal grain size [µm] and the area-ratio weighted average crystal grain size [µm] which were obtained by the EBSD measurement are as shown in the following Table I.

(1.2) Preparation of Nozzle Plate in Which Nozzle Is Formed by Laser Processing

Nozzle Plate Nos. 1 to 3 were prepared by forming the nozzle in each of the stainless steel A to stainless steel C by laser processing.

The laser processing was performed by picosecond laser processing. Specifically, a laser beam, which is emitted from a yttrium lithium fluoride (YLF) laser and has a wavelength of 1053 nm, a pulse width of 25 ps, an output of 1 W, and a repletion frequency of 1 kHz, was split into 208 beams by a diffractive optical element (DOE), the beams were condensed to a surface of the stainless steel base material on a flow passage side by an f-sin θ lens with a focal length of 100 mm, and laser ablation processing was performed while performing beam scanning by the piezo control mirror, thereby forming 208 nozzles.

In accordance with the progress of the ablation processing on the stainless steel base material, the height of the stainless steel base material was changed in order for a focal position of the lens to match a base material surface.

A nozzle shape was set to a funnel shape in which a taper angle of a nozzle inner wall is changed in two stages in any of Nozzle Plate Nos. 1 to 3, an opening diameter on the flow passage side was set to 90 µm, a first-stage taper angle was set to approximately 45°, a depth of a first-stage taper portion was set to 30 µm, a second-stage taper angle was set to approximately 9°, a depth of a second-stage taper portion as set to approximately 20 µm, and an opening diameter of the nozzle tip was set to 19.1 µm.

Frequency average crystal grain size/nozzle opening diameter [%] and area-ratio weighted average crystal grain size/nozzle opening diameter [%] which were calculated on the basis of 19.1 µm as the opening diameter of the nozzle tip are as shown in the following Table I.

(1.3) Evaluation of Nozzle Plate in which Nozzle was Formed by Laser Processing

In order to evaluate an aspect of occurrence of a deformation in Nozzle Plate Nos. 1 to 3, SEM observation was performed by using a scanning electron microscope (SEM) 54800 manufactured by Hitachi High-Tech Co., Ltd.

Figure 3A:
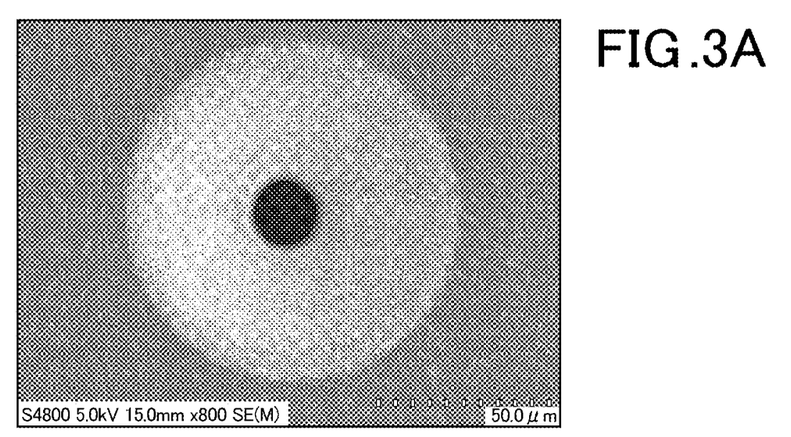
FIG. 3A is an SEM image of the entirety of nozzles of a nozzle plate formed from the stainless steel A.
Figure 3B:
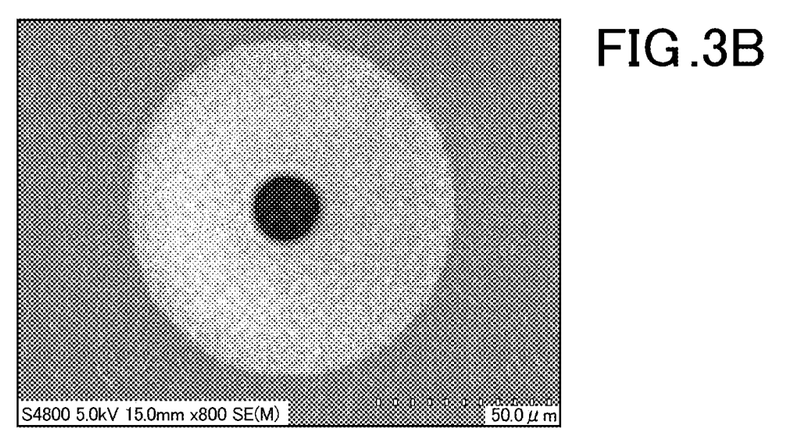
FIG. 3B is an SEM image of the entirety of nozzles of a nozzle plate formed from the stainless steel B.
Figure 3C:
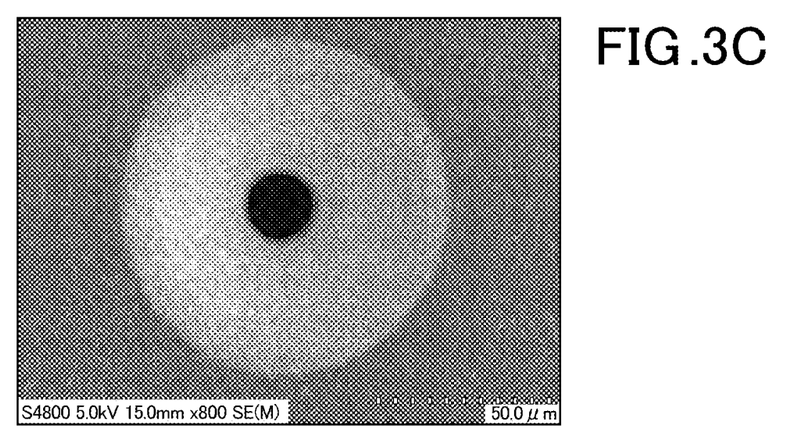
FIG. 3C is an SEM image of the entirety of nozzles of a nozzle plate formed from the stainless steel C.
Figure 4A:
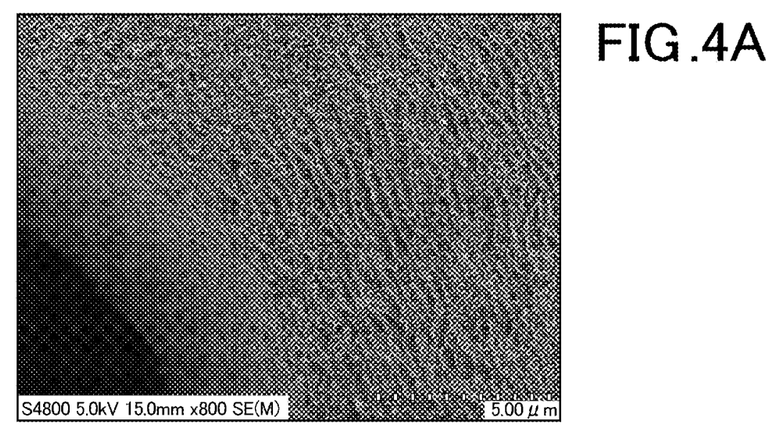
FIG. 4A is an SEM image of a nozzle inner wall of the nozzle plate formed from the stainless steel A.
Figure 4B:
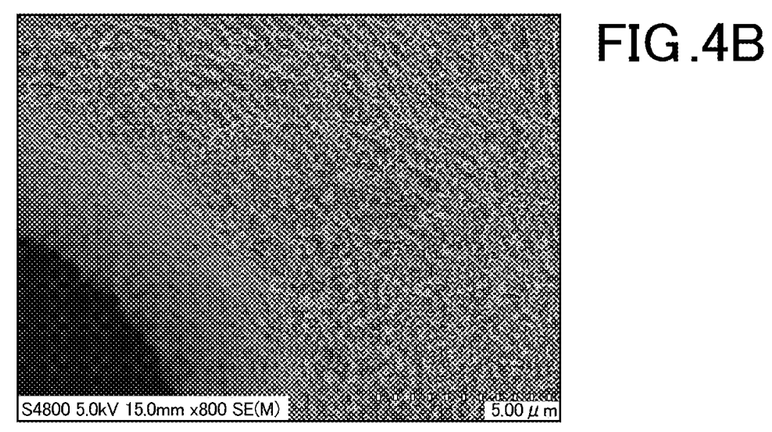
FIG. 4B is an SEM image of a nozzle inner wall of the nozzle plate formed from the stainless steel B.
Figure 4C:
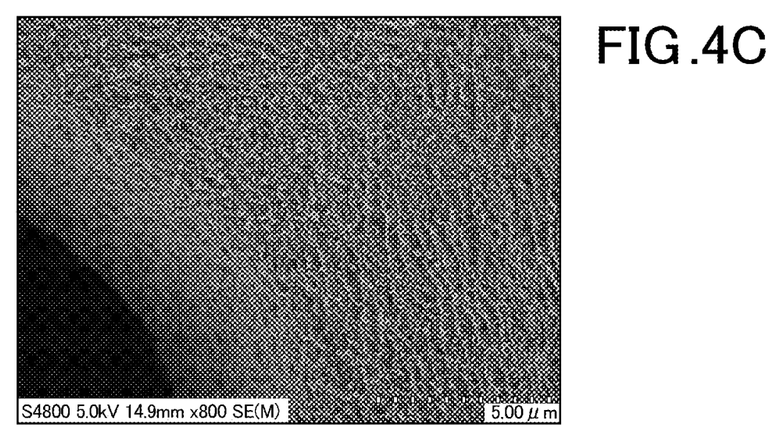
FIG. 4C is an SEM image of a nozzle inner wall of the nozzle plate formed from the stainless steel C.

FIGS. 3A to 3C, and FIGS. 4A to 4C are SEM images of the nozzles of the nozzle plate Nos. 1 to 3 which were captured on the flow passage side. FIGS. 3A to 3C are SEM images of the entirety of each nozzle in Nozzle Plate Nos. 1 to 3 which were captured at a magnification of 800 times. In addition, FIGS. 4A to 4C are SEM images of the nozzle inner wall in Nozzle Plate Nos. 1 to 3 which were captured at a magnification of 8000 times.

It was confirmed that any of Nozzle Plate Nos. 1 to 3 has the same nozzle shape and has roughly the same processability.

Figure 5:
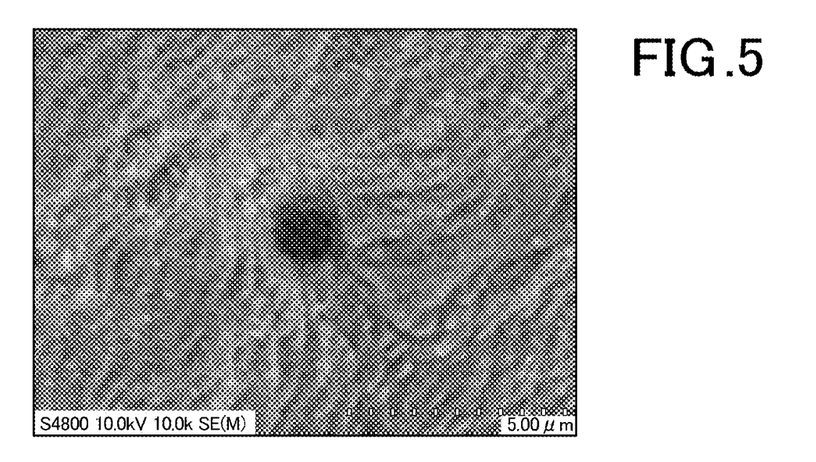
FIG. 5 is an SEM image of a minute concave portion (needle hole) as a deformation.

However, in Nozzle Plate No. 1 formed from the stainless steel A, a minute concave portion (needle hole) as a deformation occurred in the nozzle inner wall. FIG. 5 is an SEM image of the minute concave portion. The size of the minute concave portion was approximately 1 µm, and a deformation occurrence frequency was 16/208 (the number of deformations when observing 208 nozzles was 16).

On the other hand, in Nozzle Plate No. 2 formed from the stainless steel B and Nozzle Plate No. 3 formed from the stainless steel C, the deformation occurrence frequency was 0/208 (the number of deformations was 0 when observing 208 nozzles).

TABLE I

| Nozzle plates | Stainless steel | Area ratio of body centered cubic lattice | Area ratio of face centered cubic lattice | Frequency average crystal grain size | Area-ratio weighted average crystal grain size | Frequency average crystal grain size/nozzle opening diameter | Area-ratio weighted average crystal grain size/nozzle opening diameter | Deformation occurrence frequency | Remarks |
|---|---|---|---|---|---|---|---|---|---|
| No. 1 | A | 5.6% | 94.4% | 0.8 µm | 2.0 µm | 4.2% | 10.5% | 16/208 | Comparative Example |
| No. 2 | B | 5.4% | 94.6% | 0.8 µm | 2.3 µm | 4.2% | 12.0% | 0/208 | Present invention |
| No. 3 | C | 1.5% | 98.5% | 0.9 µm | 2.1 µm | 4.7% | 11.0% | 0/208 | Present invention |

The deformation occurred in the Nozzle Plate No. 1 formed from the stainless steel A is influenced by the body centered cubic lattice contained in the stainless steel as a heterogeneous phase, that is, the martensite phase. Since the martensite phase has a lower melting point in comparison to the austenite phase, the martensite phase is likely to be subjected to ablation in the laser processing in comparison to the austenite phase and becomes the cause for the deformation.

As the results in Example 1, it can be seen that when the content ratio of the martensite phase is larger than 5.4% as in the stainless steel A, the martensite phase becomes apparent as a deformation such as the minute concave portion (needle hole).

On the other hand, it can be seen that when the content ratio of the martensite phase is 5.4% or less as in the stainless steel B and the stainless steel C, the martensite phase does not become apparent as the deformation.

The reason why the content ratio of the martensite phase is larger in the stainless steel A in comparison to the stainless steel B and the stainless steel C is considered as follows. Presence or absence of the tension annealing treatment, the amount of impurities contained in a raw material, and the like have an influence on the content ratio.

In addition, in Nozzle Plate No. 2 formed from the stainless steel B and Nozzle Plate No. 3 formed from the stainless steel C, since the frequency average crystal grain size of the stainless steel is 0.9 μm or less, and the area-ratio weighted average crystal grain size is 2.1 μm or less, it is considered that the minute concave portion was less likely to occur.

(2) Example 2: Nozzle Plate in Which Nozzle is Formed by Punching+Polishing and Removal (2.1) Stainless Steel The stainless steel A and the stainless steel C used in Example 1 were used.

(2.2) Preparation of Nozzle Plate in which Nozzle is Formed by Punching+Polishing and Removal A concave portion was formed in the stainless steel A and the stainless steel C by punching, and a convex portion on a rear surface was subsequently polished and removed to form the nozzle, thereby preparing Nozzle Plate No. 4 and Nozzle Plate No. 5.

A nozzle shape was set to the same shape as in Example 1.

The punching was performed by using a punching tool having a shape conforming to the nozzle shape. The punching tool was pressed into a surface of the stainless steel base material on a flow passage side to plastically deform the stainless steel base material, and a concave shape to which the nozzle shape is transferred was formed. In addition, when the punching tool was pressed, a die provided with a punching die was used to receive and grip the deformed and protruding stainless steel base material.

Next, the nozzle was formed by scrapping off the convex portion formed on an ejection surface side through polishing. Specifically, the convex portion was polished and removed by two stages of polishing including rough polishing and finish polishing.

The rough polishing was performed with tape polishing. As a polishing film, a film in which abrasive grains are bonded to one surface of a polyester film having a thickness of 75 μm was used.

The finish polishing was performed with chemical mechanical polishing (CMP). When performing supply of a polishing solution containing a polishing agent, pressing of a polishing pad, and relative movement of a workpiece in parallel, due to a combined effect of a chemical effect and mechanical polishing, an unevenness left in the rough polishing was scraped to obtain a very flat surface.

(2.3) Evaluation of Nozzle Plate in which Nozzle is Formed by Punching+Polishing and Removal SEM observation was performed with respect to Nozzle Plate No. 4 and Nozzle Plate No. 5 as in Example 1. It was confirmed that in any of Nozzle Plate No. 4 and Nozzle Plate No. 5, the same nozzle shape is obtained, and rough processability was equivalent.

Figure 6:
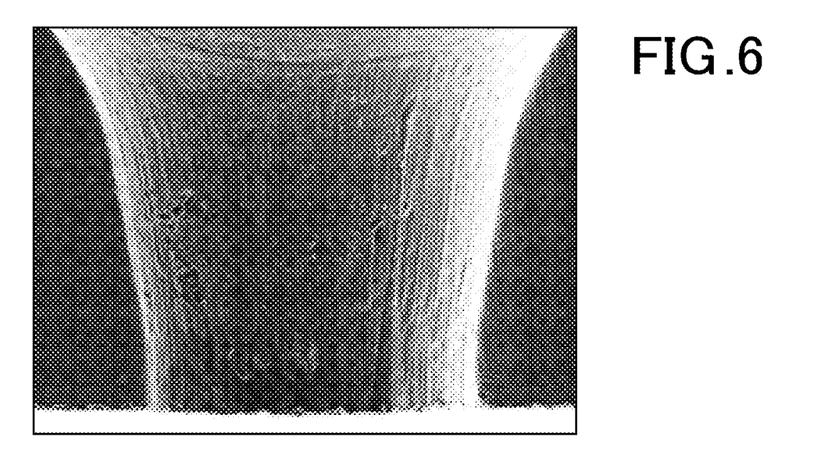
FIG. 6 is a cross-sectional SEM image of a nozzle having a stripe-shaped concavo-convex portion and a burr as a deformation.

However, in Nozzle Plate No. 4 formed from the stainless steel A, a stripe-shaped concavo-convex portion occurred in the nozzle inner wall, and a burr occurred in an edge of the nozzle tip. FIG. 6 is an SEM image of a nozzle showing the stripe-shaped concavo-convex portion in the nozzle inner wall, or a burr shape in the nozzle tip. One nozzle in Nozzle Plate No. 4 was cut out, and an image of the cross-section in the vicinity of the nozzle tip was captured. In the drawing, a lower side corresponds to the nozzle tip.

Figure 7:
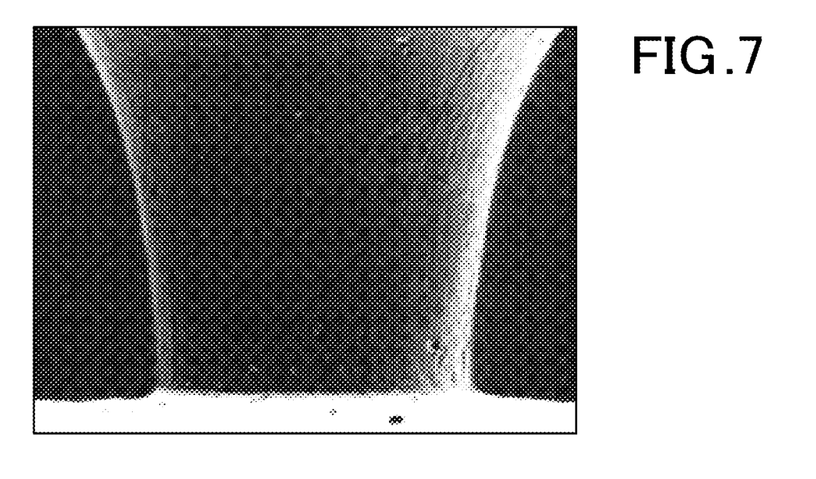
FIG. 7 is a cross-sectional SEM image of a nozzle that does not have a deformation.

On the other hand, in Nozzle Plate No. 5 formed from the stainless steel C, the stripe-shaped concavo-convex portion or the burr was not confirmed. FIG. 7 is an SEM image of a nozzle having good quality without the stripe-shaped concavo-convex portion or the burr. One nozzle of Nozzle Plate No. 5 was cut out, and an image of the cross-section in the vicinity of the nozzle tip was captured. In the drawing, a lower side corresponds to the nozzle tip.

A deformation occurred in Nozzle Plate No. 4 formed from the stainless steel A is influenced by the body centered cubic lattice included in the stainless steel as a heterogeneous phase, that is, the martensite phase. When the stainless steel is plastically deformed by punching, a plastic deformation response deviates between a peripheral austenite phase and the martensite phase, and thus the stripe-shaped concavo-convex portion occurs in the nozzle inner wall from the flow passage side toward the nozzle tip side.

From Example 2, it can be seen that when the content ratio of the martensite phase is more than 5.4% as in the stainless steel A, the stripe-shape concavo-convex portion is likely to occur.

Furthermore, in Nozzle Plate No. 4 formed from the stainless steel A, since the stripe-shaped concavo-convex portion was formed in the nozzle inner wall, when subsequently polishing and removing a convex portion on a rear surface, a burr was formed in an edge of the nozzle tip.

On the other hand, it can be seen that when the content ratio of the martensite phase is 5.4% or less as in the stainless steel C, the stripe-shaped concavo-convex portion does not occur.

In addition, in Nozzle Plate No. 5 formed from the stainless steel C, since the frequency average crystal grain size of the stainless steel is 0.9 μm or less, and the area-ratio weighed average crystal grain size is 2.1 μm or less, it is considered that the stripe-shaped concavo-convex portion was less likely to occur.

INDUSTRIAL APPLICABILITY

The invention can be used in an inkjet head nozzle formed from stainless steel plate in which a deformation in a nozzle inner wall or a nozzle tip is less, a method of manufacturing the inkjet head nozzle plate, and an inkjet head and an inkjet recording device which use the inkjet head nozzle plate.

The invention claimed is:

1. An inkjet head nozzle plate that is formed from at least stainless steel,
    wherein the stainless steel is austenitic stainless steel in which a content ratio of a martensite phase is 5.4% or less;
    wherein the stainless steel is stainless steel in which a ratio of a frequency average crystal grain size that is measured by electron backscatter diffraction to an opening diameter of a nozzle tip is 4.7% or less.

2. The inkjet head nozzle plate according to claim 1, wherein the stainless steel is stainless steel in which a frequency average crystal grain size that is measured by electron backscatter diffraction is 0.9 μm or less.

3. The inkjet head nozzle plate according to claim 1, wherein the stainless steel is stainless steel in which a area-ratio weighed average crystal grain size that is measured by electron backscatter diffraction is 2.3 μm or less.

4. A method of manufacturing the inkjet head nozzle plate according to claim 1, comprising:

a process of forming a nozzle by laser processing.

5. A method of manufacturing the inkjet head nozzle plate according to claim 1, comprising:

a process of forming a nozzle by forming a concave portion by punching, and of subsequently polishing and removing a convex portion on a rear surface.

6. An inkjet head that uses the inkjet head nozzle plate according to claim 1.

7. An inkjet recording device, comprising:

the inkjet head according to claim 6.

8. An inkjet head nozzle plate that is formed from at least stainless steel, wherein the stainless steel is stainless steel in which an area ratio of a face centered cubic lattice which is measured by electron backscatter diffraction is 92.0% or more, and an area ratio of a body centered cubic lattice which is measured by electron backscatter diffraction is 5.4% or less.

9. The inkjet head nozzle plate according to claim 8, wherein the stainless steel is stainless steel in which a frequency average crystal grain size that is measured by electron backscatter diffraction is 0.9 μm or less.

10. The inkjet head nozzle plate according to claim 8, wherein the stainless steel is stainless steel in which a ratio of an area-ratio weighted average crystal grain size that is measured by electron backscatter is 2.3 μm or less.

11. The inkjet head nozzle plate according to claim 8, wherein the stainless steel is stainless steel in which a ratio of a frequency average crystal grain size that is measured by electron backscatter diffraction to an opening diameter of a nozzle tip is 4.7% or less.

12. The inkjet head nozzle plate according to claim 8, wherein the stainless steel is stainless steel in which a ratio of an area-ratio weighted average crystal grain size that is measured by electron backscatter diffraction to an opening diameter of a nozzle tip is 12.0% or less.

13. A method of manufacturing the inkjet head nozzle plate according to claim 8, comprising:

a process of forming a nozzle by laser processing.

14. A method of manufacturing the inkjet head nozzle plate according to claim 8, comprising:

a process of forming a nozzle by forming a concave portion by punching, and of subsequently polishing and removing a convex portion on a rear surface.

15. An inkjet head that uses the inkjet head nozzle plate according to claim 8.

16. An inkjet recording device, comprising:

the inkjet head according to claim 15.

17. An inkjet head nozzle plate that is formed from at least stainless steel, wherein the stainless steel is austenitic stainless steel in which a content ratio of a martensite phase is 5.4% or less;

wherein the stainless steel is stainless steel in which a ratio of an area-ratio weighted average crystal grain size that is measured by electron backscatter diffraction to an opening diameter of a nozzle tip is 12.0% or less.

* * * * *